US012752692B1

(12) United States Patent
Tulecki

(10) Patent No.: US 12,752,692 B1
(45) Date of Patent: Oct. 6, 2026

(54) OBJECT-LOADING RACK FOR PICKUP TRUCKS

(71) Applicant: Richard Tulecki, Hollywood, FL (US)

(72) Inventor: Richard Tulecki, Hollywood, FL (US)

( * ) Notice: Subject to any disclaimer, the term of this patent is extended or adjusted under 35 U.S.C. 154(b) by 266 days.

(21) Appl. No.: 18/740,729

(22) Filed: Jun. 12, 2024

(51) Int. Cl.
*B60P 3/06* (2006.01)
*B60P 1/54* (2006.01)

(52) U.S. Cl.
CPC ............... *B60P 1/5457* (2013.01); *B60P 3/06* (2013.01)

(58) Field of Classification Search
CPC ..................................................... B60P 3/1025
See application file for complete search history.

(56) References Cited

U.S. PATENT DOCUMENTS

| | | | | |
|---|---|---|---|---|
| 3,648,866 | A | 3/1972 | Slown | |
| 3,732,998 | A | 5/1973 | Martin | |
| 3,734,321 | A | 5/1973 | Shelton | |
| 3,840,133 | A * | 10/1974 | Berg | B60P 3/1025 414/537 |
| 3,877,594 | A | 4/1975 | Coakley | |
| 3,972,433 | A | 8/1976 | Reed | |
| 5,108,248 | A | 4/1992 | Murrill | |
| 5,232,329 | A * | 8/1993 | Livingston | B60P 1/6454 414/500 |
| 5,505,579 | A * | 4/1996 | Ray | B60R 9/042 224/310 |
| 6,099,232 | A * | 8/2000 | Dixon | B60P 1/6454 414/500 |
| 8,133,000 | B2 | 3/2012 | Olson | |
| 8,376,684 | B2 | 2/2013 | Juarez-Ortega | |
| 11,059,410 | B2 * | 7/2021 | Garneau | B60P 1/48 |
| 2004/0028511 | A1 | 2/2004 | Eaton | |
| 2006/0285954 | A1 * | 12/2006 | Neary | B60R 9/042 414/465 |
| 2009/0025154 | A1 * | 1/2009 | Smith | B60P 3/122 14/71.7 |
| 2011/0202199 | A1 * | 8/2011 | Crane | B60P 3/122 701/2 |
| 2012/0294700 | A1 * | 11/2012 | Ervin | B60P 1/548 254/46 |
| 2013/0243563 | A1 * | 9/2013 | Piercey, III | B60P 3/122 414/813 |
| 2018/0370409 | A1 * | 12/2018 | Olson | B60P 1/003 |
| 2019/0232854 | A1 * | 8/2019 | Frost | B60P 3/1025 |
| 2024/0058187 | A1 * | 2/2024 | Stranko | B60P 1/431 |

* cited by examiner

*Primary Examiner* — Daniel Vetter
(74) *Attorney, Agent, or Firm* — Kyle A. Fletcher, Esq.

(57) ABSTRACT

The object-loading rack for pickup trucks includes a pan, a pan track, a plurality of pan track mounts, a pair of hydraulic cylinders, a plurality of vessel carrier adapters, and a deployable crane. The pan may be moved to a loading position on the ground behind a pickup truck to place an object onto the pan or to remove the object from the pan. The pan may be moved to a transport position resting in the pan track above the pickup truck for transportation. The plurality of pan track mounts may support the pan track. The plurality of vessel carrier adapters may be detachably coupled to the pan to support a vessel. The deployable crane may be detachably coupled to the pan to raise and lower the object. As non-limiting examples, the object may be a vehicle, the vessel, or other cargo.

19 Claims, 8 Drawing Sheets

OBJECT-LOADING RACK FOR PICKUP TRUCKS

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of car carriers, boat trailers, and cargo transportation systems, more specifically, an object-loading rack for pickup trucks.

SUMMARY OF INVENTION

The object-loading rack for pickup trucks may comprise a pan, a pan track, a plurality of pan track mounts, a pair of hydraulic cylinders, a plurality of vessel carrier adapters, and a deployable crane. The pan may be moved to a loading position on the ground behind a pickup truck to place an object onto the pan or to remove the object from the pan. The pan may be moved to a transport position resting in the pan track above the pickup truck for transportation. The plurality of pan track mounts may support the pan track. The plurality of vessel carrier adapters may be detachably coupled to the pan to support a vessel. The deployable crane may be detachably coupled to the pan to raise and lower the object. As non-limiting examples, the object may be a vehicle, the vessel, or other cargo.

An object of the invention is to provide a pan for carrying an object that may be moved between a loading position and a transport position.

Another object of the invention is to provide a pan track, a plurality of pan track mounts, and a pair of hydraulic cylinders that may support the pan and may move the pan between the loading position and the transport position.

A further object of the invention is to provide a plurality of vessel carrier adapted that may be detachably coupled to the pan to support a vessel.

Yet another object of the invention is to provide a deployable crane that may be detachably coupled to the pan in order to move an object between the pan and the ground.

These together with additional objects, features and advantages of the object-loading rack for pickup trucks will be readily apparent to those of ordinary skill in the art upon reading the following detailed description of the presently preferred, but nonetheless illustrative, embodiments when taken in conjunction with the accompanying drawings.

In this respect, before explaining the current embodiments of the object-loading rack for pickup trucks in detail, it is to be understood that the object-loading rack for pickup trucks is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the object-loading rack for pickup trucks.

It is therefore important that the claims be regarded as including such equivalent construction insofar as they do not depart from the spirit and scope of the object-loading rack for pickup trucks. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word “or” is intended to be inclusive.

Figure 1:
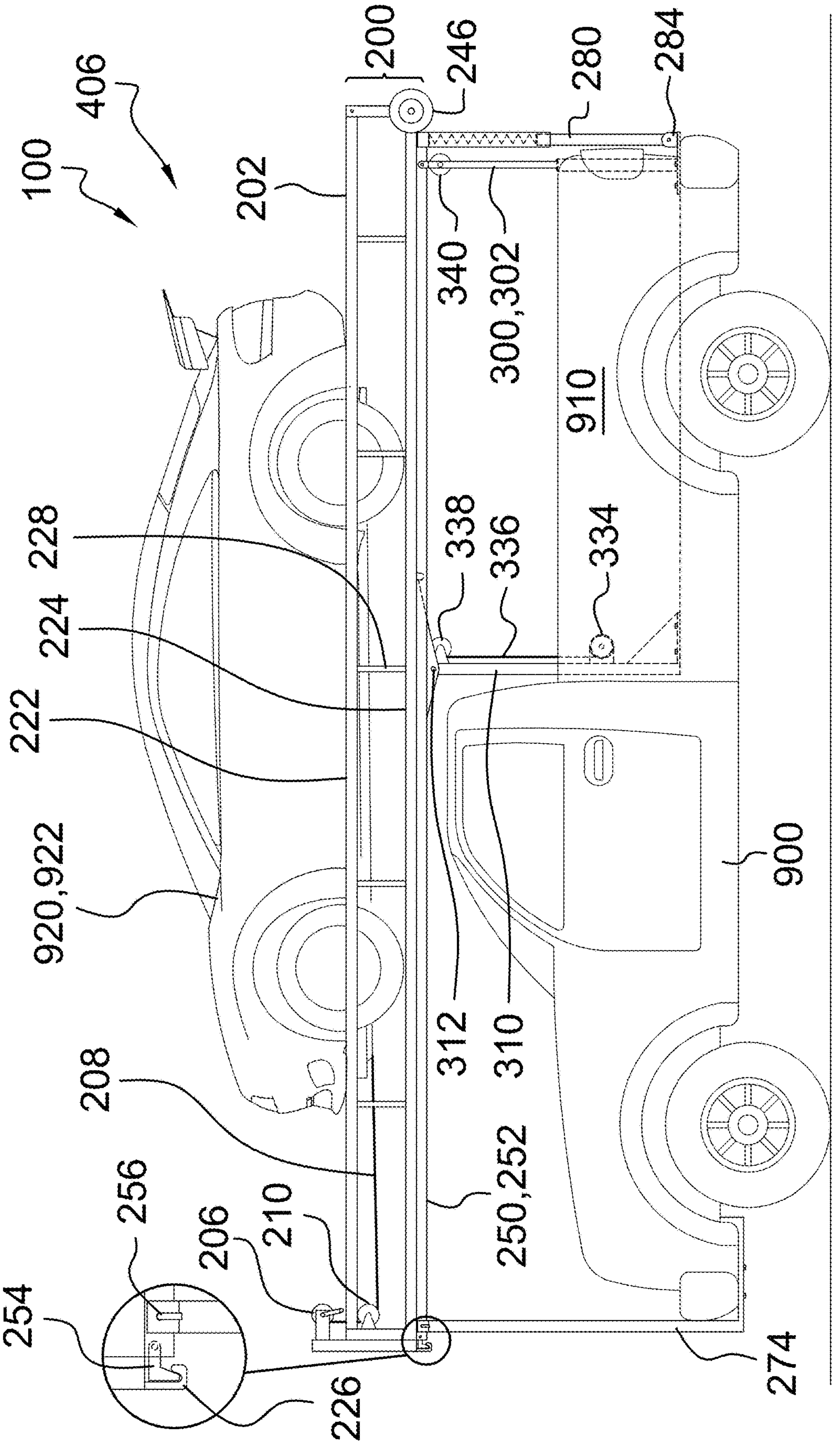
FIG. 1 is a side in-use view of an embodiment of the disclosure, illustrating the pan in the transport position.
Figure 2:
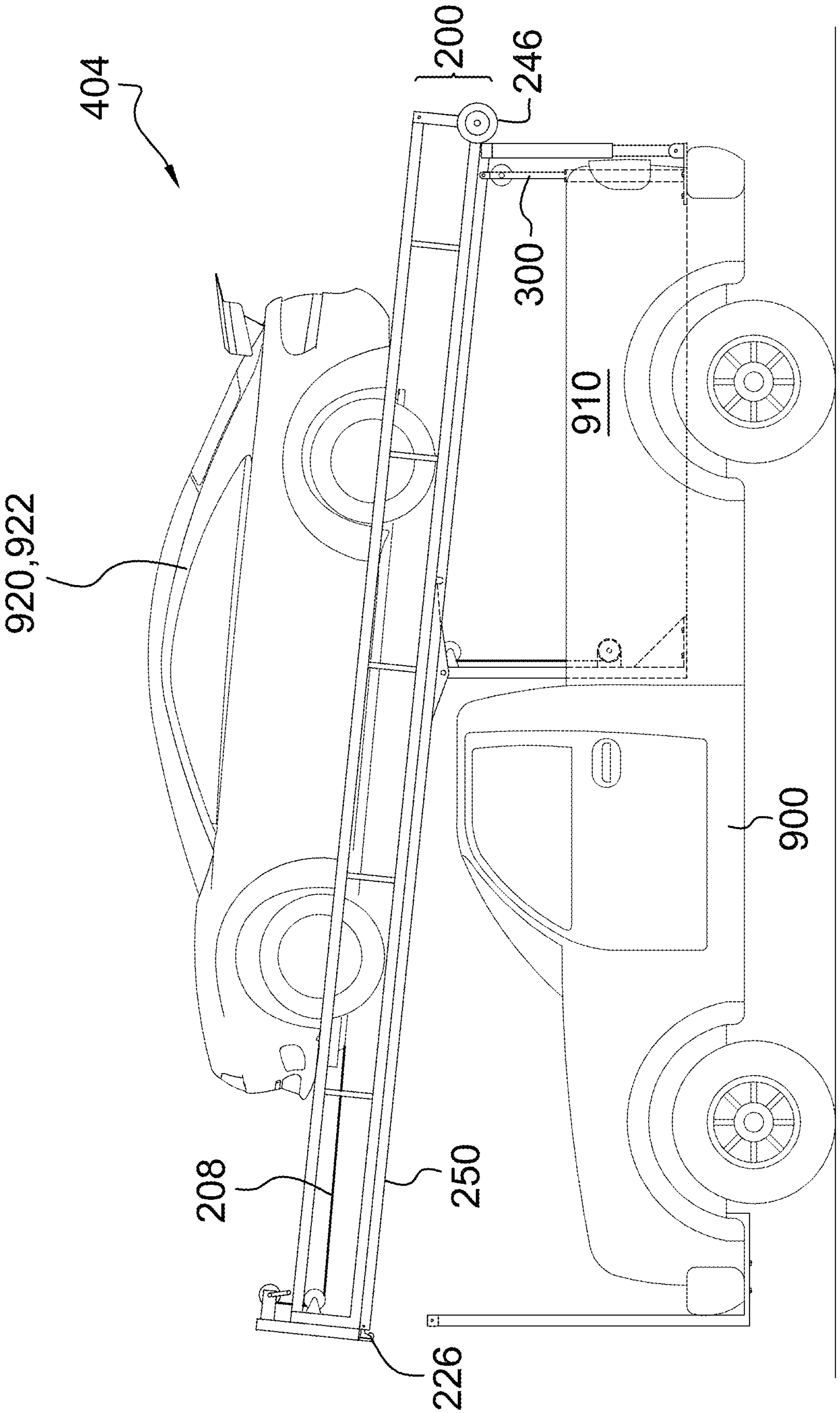
FIG. 2 is a side in-use view of an embodiment of the disclosure, illustrating the pan in the second intermediate position.
Figure 3:
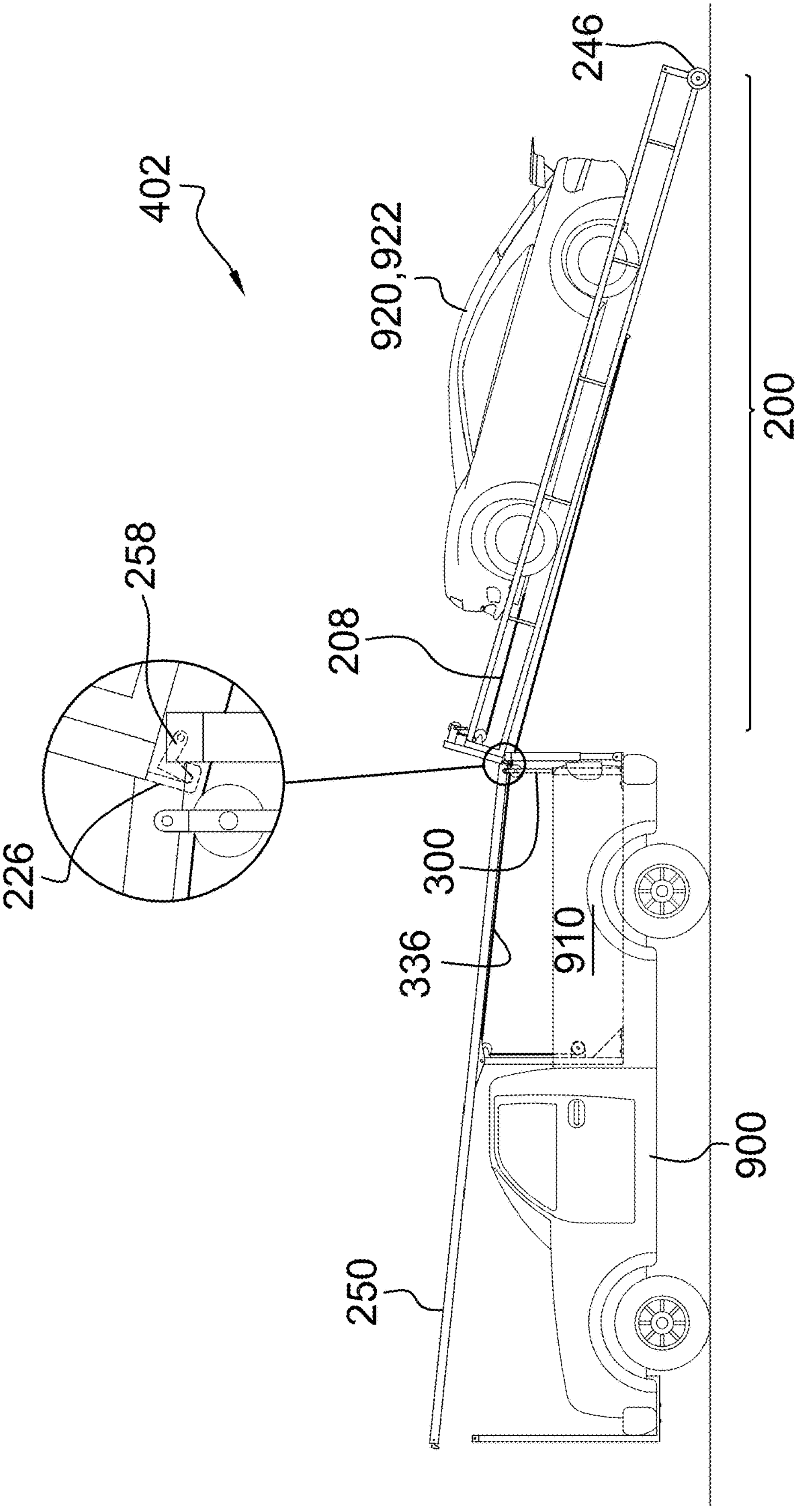
FIG. 3 is a side in-use view of an embodiment of the disclosure, illustrating the pan in the first intermediate position.
Figure 4:
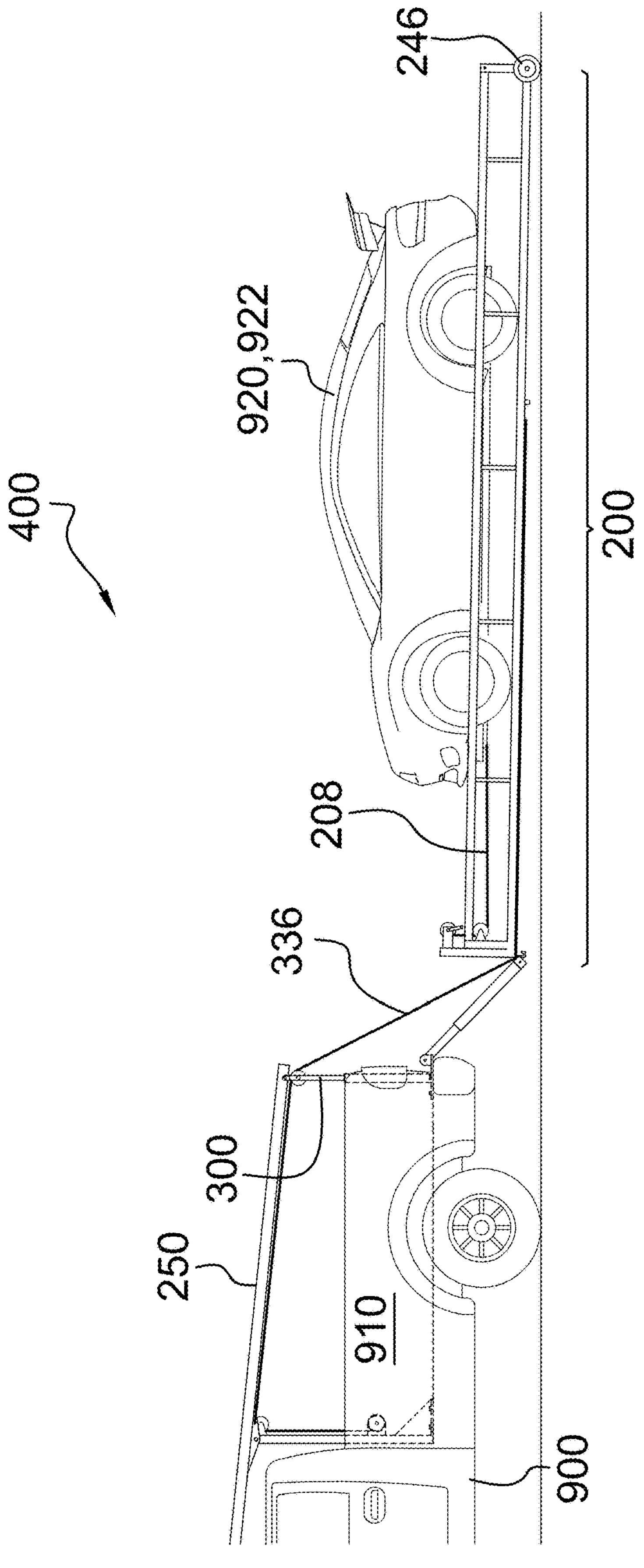
FIG. 4 is a side in-use view of an embodiment of the disclosure, illustrating the pan in the loading position.
Figure 5:
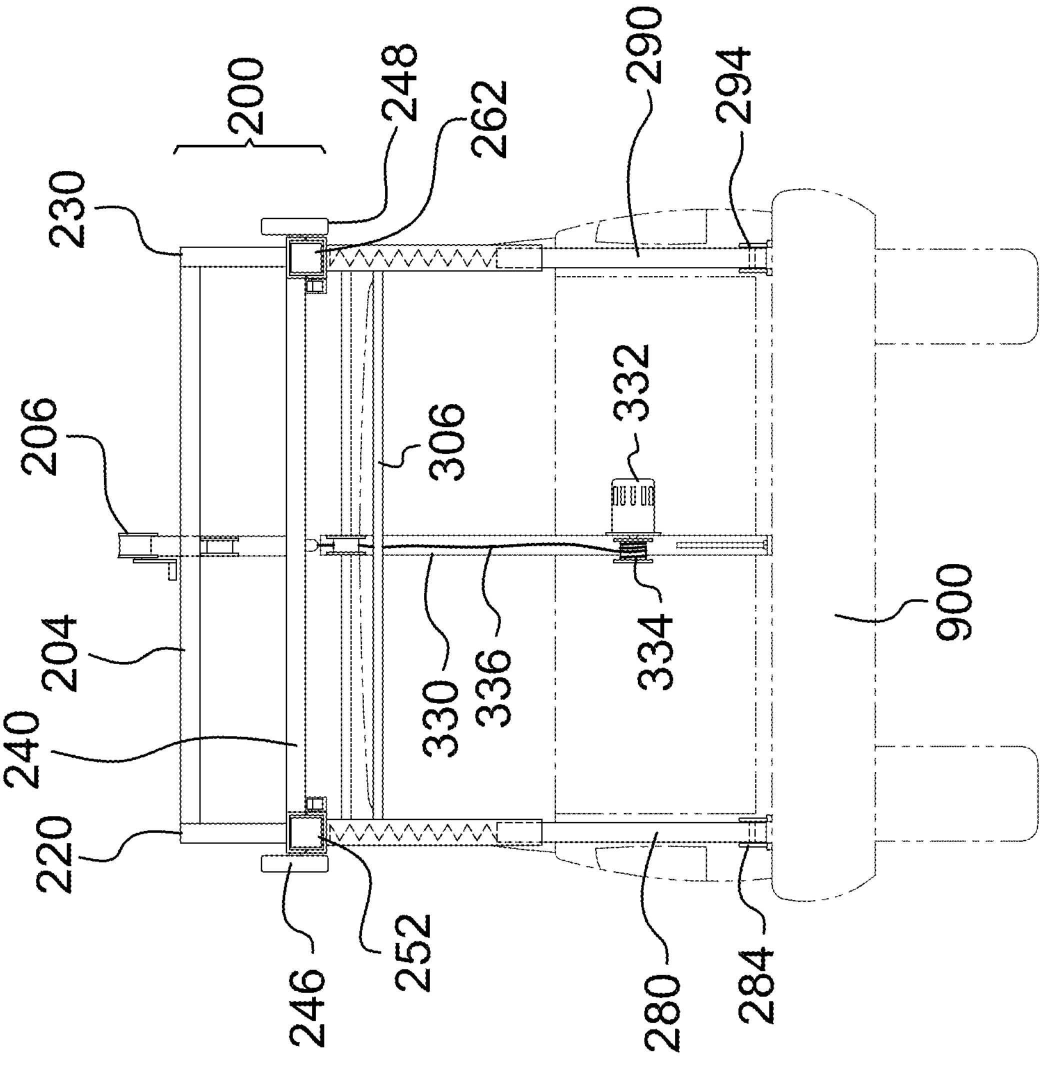
FIG. 5 is a rear view of an embodiment of the disclosure.
Figure 6:
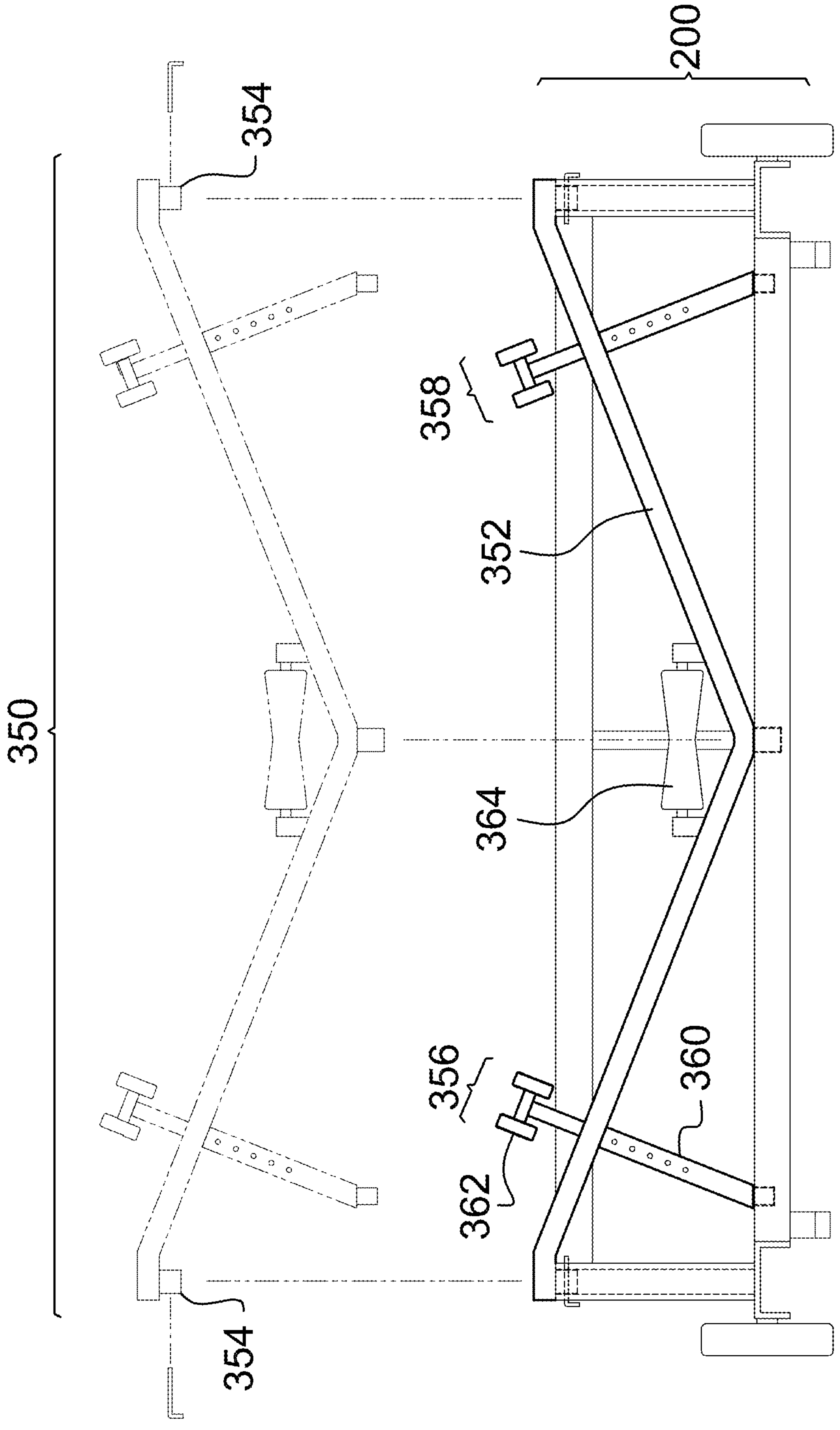
FIG. 6 is a rear detail view of an embodiment of the disclosure, illustrating an individual vessel carrier adapter coupling to the pan.
Figure 7:
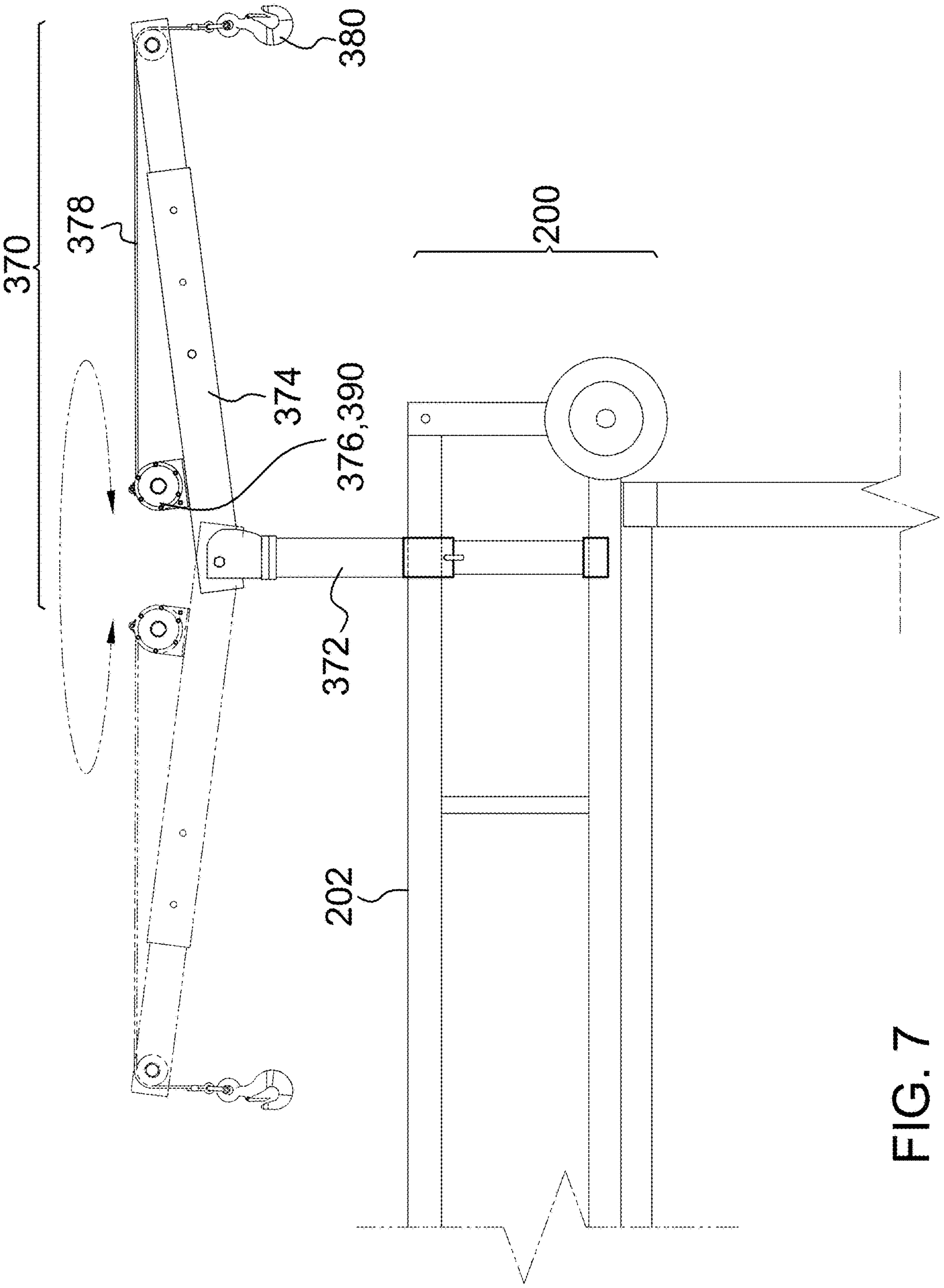
FIG. 7 is a side detail view of an embodiment of the disclosure, illustrating the deployable crane.
Figure 8:
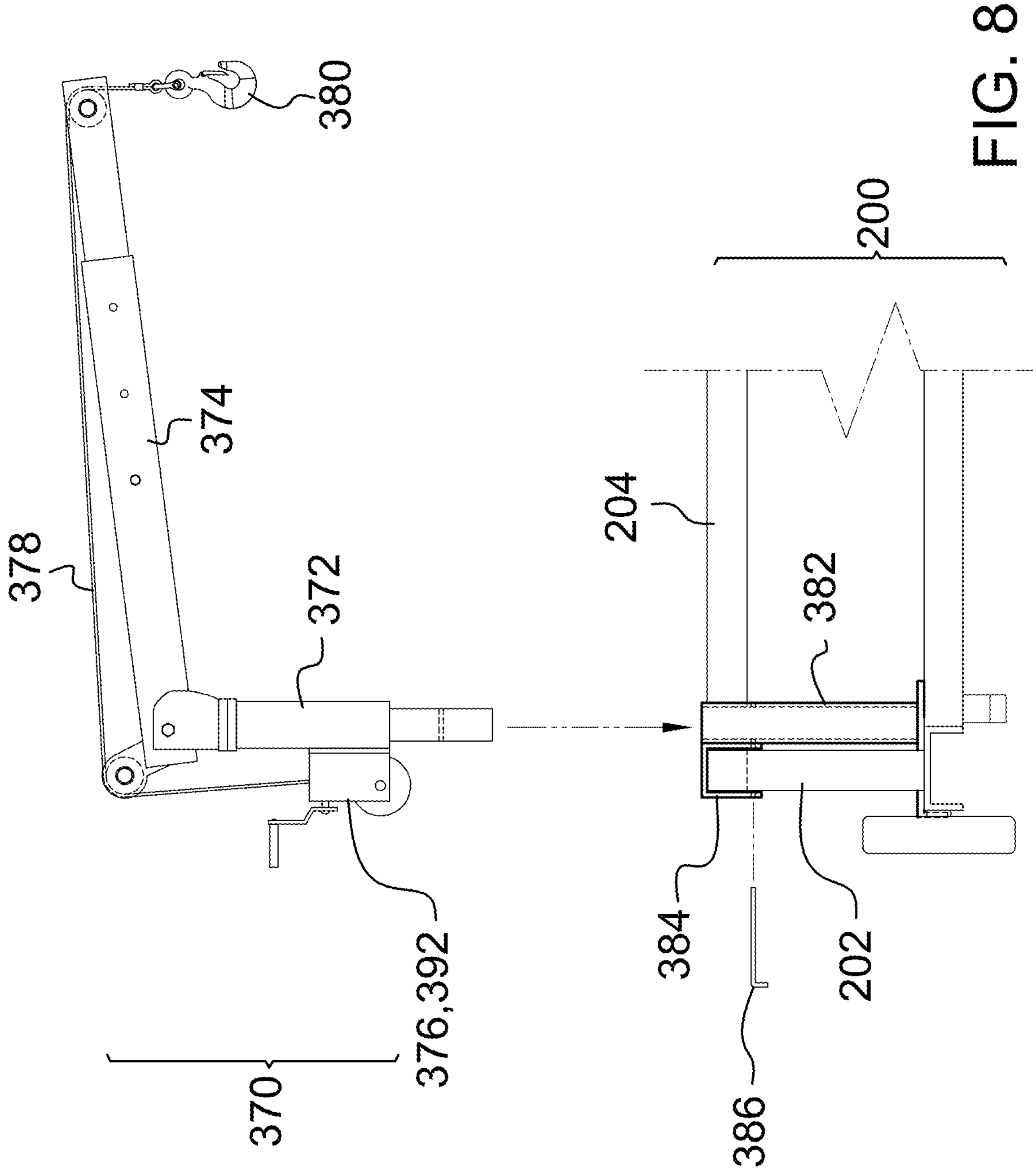
FIG. 8 is a rear view of an embodiment of the disclosure, illustrating the deployable crane.

Detailed reference will now be made to a first potential embodiment of the disclosure, which is illustrated in FIGS. 1 through 8.

The object-loading rack for pickup trucks 100 (hereinafter invention) comprises a pan 200, a pan track 250, a plurality of pan track mounts, a pair of hydraulic cylinders 300, a plurality of vessel carrier adapters, and a deployable crane 370. The pan 200 may be moved to a loading position 400 on the ground behind a pickup truck 900 to place an object 920 onto the pan 200 or to remove the object 920 from the pan 200. The pan 200 may be moved to a transport position 406 resting in the pan track 250 above the pickup truck 900 for transportation. The plurality of pan track mounts may support the pan track 250 and may assist in lifting the pan 200. The plurality of vessel carrier adapters may be detachably coupled to the pan 200 to support a vessel. The deployable crane 370 may be detachably coupled to the pan 200 to raise and lower the object 920. As non-limiting examples, the object 920 may be a vehicle 922, the vessel, or other cargo.

The pan 200 may comprise a frame 202, flooring, an aft starboard wheel 246, and an aft port wheel 248. The pan 200 may be a moveable platform that may hold the object 920. The pan 200 may move in stages between the loading position 400 and the transport position 406. The pan 200 may be pulled onto the pan track 250 to the transport position 406.

The frame 202 may comprise a front frame 204, a starboard frame side 220, a port frame side 230, and a plurality of frame cross supports 240. The front frame 204 may extend laterally across the front of the frame 202 and may define a front barrier for the pan 200. The front frame 204 may couple the front of the starboard frame side 220 to the front of the port frame side 230. A bow winch 206 may be coupled to the front frame 204. The bow winch 206 may be operable to pull the object 920 onto the pan 200 using a first cable 208. A first guide wheel 210, coupled to the front frame 204, may redirect the first cable 208 from the bow winch 206 to the object 920.

The starboard frame side 220 may be the longitudinally-oriented starboard side of the pan 200. A starboard top rail 222 and a starboard bottom rail 224 may be oriented horizontally with the starboard top rail 222 positioned above and parallel to the starboard bottom rail 224. The starboard top rail 222 may comprise the top of the starboard frame side 220 and the starboard bottom rail 224 may comprise the bottom of the starboard frame side 220. A plurality of starboard upright armatures 228 may be vertically oriented and may be arranged along the starboard frame side 220 with the tops of the plurality of starboard upright armatures 228 coupled to the starboard top rail 222 and the bottoms of the plurality of starboard upright armatures 228 coupled to the starboard bottom rail 224. The front of the starboard bottom rail 224 may comprise a starboard hook 226 positioned on the starboard bottom rail 224. The starboard hook 226 may be operable to secure the bottom front of the pan 200 to the pan track 250.

The port frame side 230 may be the longitudinally-oriented port side of the pan 200. A port top rail and a port bottom rail may be oriented horizontally with the port top rail positioned above and parallel to the port bottom rail. The port top rail may comprise the top of the port frame side 230 and the port bottom rail may comprise the bottom of the port frame side 230. A plurality of port upright armatures may be vertically oriented and may be arranged along the port frame side 230 with the tops of the plurality of port upright armatures coupled to the port top rail and the bottoms of the plurality of port upright armatures coupled to the port bottom rail. The front of the port bottom rail may comprise a port hook positioned on the port bottom rail. The port hook may be operable to secure the bottom front of the pan 200 to the pan track 250.

The plurality of frame cross supports 240 may be laterally-oriented parallel armatures that couple the starboard bottom rail 224 to the port bottom rail. The flooring may comprise one or more horizontally-oriented panels that are coupled to the plurality of frame cross supports 240 to provide a platform for the object 920 that is being transported in the pan 200. As non-limiting examples, the flooring may be one continuous panel that covers the bottom of the pan 200 or a plurality of longitudinally-oriented panels that provide tread plates for vehicle wheels to roll over.

The aft starboard wheel 246 may be rotationally coupled to the rear of the starboard bottom rail 224 and the aft port wheel 248 may be rotationally coupled to the rear of the port bottom rail. The aft starboard wheel 246 and the aft port wheel 248 may be operable to reduce friction between the rear of the pan 200 and the ground as the pan 200 is pulled across the ground while raising and lowering the pan 200.

The pan track 250 may be suspended above the pickup truck 900 by the plurality of pan track mounts. The pan track 250 may support the pan 200 during transportation of the pan 200. The pan track 250 may tilt during loading and unloading operations. The pan track 250 may comprise a starboard track 252 and a port track 262.

The starboard track 252 may be longitudinally-oriented and located on the starboard side of the pan track 250. The starboard track 252 may be configured to guide the starboard bottom rail 224 of the pan 200 as the starboard bottom rail 224 moves longitudinally along the starboard track 252. The starboard track 252 may comprise a forward starboard locking latch 254 that may be operable to engage with the starboard hook 226 on the pan 200 to secure the starboard bottom rail 224 to the front of the starboard track 252. A forward starboard locking pin 256 may prevent the forward starboard locking latch 254 and the starboard hook 226 from disengaging until the forward starboard locking pin 256 is actuated.

The port track 262 may be longitudinally-oriented and located on the port side of the pan track 250. The port track 262 may be configured to guide the port bottom rail of the pan 200 as the port bottom rail moves longitudinally along the port track 262. The port track 262 may comprise a forward port locking latch that may be operable to engage with the port hook on the pan 200 to secure the port bottom rail to the front of the port track 262. A forward port locking pin may prevent the forward port locking latch and the port hook from disengaging until the forward port locking pin is actuated. In some embodiments, the starboard track 252 and the port track 262 may be coupled by a plurality of lateral track supports for stabilization.

The plurality of pan track mounts may comprise forward pan track mounts, aft pan track mounts, and mid pan track mounts. The plurality of pan track mounts may elevate the pan track 250 above the pickup truck 900. The forward pan track mounts may comprise a forward starboard stanchion 274 and a forward port stanchion. The forward starboard stanchion 274 may be a vertically-oriented armature that supports the pan track 250. The forward starboard stanchion 274 may be located on the starboard side of the pan track 250 at the front of the pickup truck 900. The top of the forward starboard stanchion 274 may couple to the pan track 250. The bottom of the forward starboard stanchion 274 may couple to a front bumper. The forward port stanchion may be a vertically-oriented armature that supports the pan track 250. The forward port stanchion may be located on the port side of the pan track 250 at the front of the pickup truck 900. The top of the forward port stanchion may couple to the pan track 250. The bottom of the forward port stanchion may couple to the front bumper. The tops of the forward starboard stanchion 274 and the forward port stanchion may detach from the pan track 250 while loading and unloading the pan track 250.

The aft pan track mounts may comprise an aft starboard stanchion 280 and an aft port stanchion 290. The aft starboard stanchion 280 may be a vertically-oriented armature that supports the pan track 250. The aft starboard stanchion 280 may be located on the starboard side of the pan track 250 at the rear of the pickup truck 900. The top of the aft starboard stanchion 280 may comprise an aft starboard locking latch 258 that may engage the starboard hook 226 when the pan 200 is pulled to the rear. An aft starboard locking pin may prevent the aft starboard locking latch 258 and the starboard hook 226 from disengaging until the aft starboard locking pin is actuated. The bottom of the aft starboard stanchion 280 may pivotably couple to a rear bumper via an aft starboard bottom pivot 284. The aft port stanchion 290 may be a vertically-oriented armature that supports the pan track 250. The aft port stanchion 290 may be located on the port side of the pan track 250 at the rear of the pickup truck 900. The top of the aft port stanchion 290 may comprise an aft port locking latch that may engage the port hook when the pan 200 is pulled to the rear. An aft port locking pin may prevent the aft port locking latch and the port hook from disengaging until the aft port locking pin is actuated. The bottom of the aft port stanchion 290 may pivotably couple to the rear bumper via an aft port bottom pivot 294. The aft pan track mounts may pivot to load and unload the pan 200. The aft pan track mounts may be vertically upright when the pan 200 is in the transport position 406. The aft pan track mounts may pivot rearward placing the tops of the aft pan track mounts proximal to the ground when the pan 200 is in the loading position 400. In some embodiments, an aft stanchion support armature 306 may couple the tops of the aft pan track mounts to stabilize the aft pan track mounts during pivoting.

The mid pan track mounts may comprise a mid starboard stanchion 310 and a mid port stanchion. The mid pan track mounts may define a tipping point for the pan 200 during loading and unloading. The mid starboard stanchion 310 may be a vertically-oriented armature that supports the pan track 250. The mid starboard stanchion 310 may be located on the starboard side of the pan track 250 centered front-to-rear on the pickup truck 900. The top of the mid starboard stanchion 310 may pivotably couple to the pan track 250 via a mid starboard pivot 312. The bottom of the mid starboard stanchion 310 may couple to the bed 910. The mid port stanchion may be a vertically-oriented armature that supports the pan track 250. The mid port stanchion may be located on the port side of the pan track 250 centered front-to-rear on the pickup truck 900. The top of the mid port stanchion may pivotably couple to the pan track 250 via a mid port pivot. The bottom of the mid port stanchion may couple to the bed 910.

A mid center support armature 330 may be a vertical armature that supports a motor 332 and a second guide wheel 338. The top of the mid center support armature 330 may be coupled to the pan track 250. The bottom of the mid center support armature 330 may be coupled to the bed 910 of the pickup truck 900. The motor 332, a cable reel 334, and a second cable 336 may comprise a winch to raise the pan 200 onto the pan track 250. One end of the second cable 336 may be coupled to the cable reel 334 and the opposite end of the second cable 336 may be coupled to the bottom center of the pan 200. The second cable 336 may be wound around the cable reel 334 by the motor 332 to raise the pan 200 and may be unwound from the cable reel 334 to lower the pan 200. The second guide wheel 338 may redirect the second cable 336 from vertical motion to more horizontal motion to reach the pan 200. A third guide wheel 340, which may be coupled to a laterally-oriented armature at the rear of the pan track 250, may further redirect the second cable 336 once the pan 200 begins to descend towards the ground.

The pair of hydraulic cylinders 300 may comprise a starboard hydraulic cylinder 302 and a port hydraulic cylinder. The starboard hydraulic cylinder 302 may be a vertically-oriented hydraulic cylinder located on the starboard side of the pickup truck 900. The bottom of the starboard hydraulic cylinder 302 may be coupled to the rear bumper of the pickup truck 900. The top of the starboard hydraulic cylinder 302 may be pivotably coupled to the pan track 250. The port hydraulic cylinder may be a vertically-oriented hydraulic cylinder located on the port side of the pickup truck 900. The bottom of the port hydraulic cylinder may be coupled to the rear bumper of the pickup truck 900. The top of the port hydraulic cylinder may be pivotably coupled to the pan track 250. The pair of hydraulic cylinders 300 may be operated at the same time to move the rear of the pan track 250 up and down, thus changing the tilt of the pan track 250. The rear of the pan track 250 may be pulled down by the pair of hydraulic cylinders 300 to tilt the pan track 250 for loading and unloading. The rear of the pan track 250 may be pushed up by the pair of hydraulic cylinders 300 to level the pan track 250 for transportation.

The plurality of vessel carrier adapters may be detachably coupled to the pan 200 to adapt the pan 200 for transporting the vessel. The plurality of vessel carrier adapters may be laterally-oriented during use. The vessel may be placed on top of the plurality of vessel carrier adapters such that the vessel may be cradled within the plurality of vessel carrier adapters. An individual vessel carrier adapter 350 selected from the plurality of vessel carrier adapters may comprise a hull support bracket 352, a plurality of roller support brackets, and an hourglass roller 364.

The hull support bracket 352 may be a V-shaped armature. The hull support bracket 352 may comprise a plurality of frame couplers 354 to detachably couple the hull support bracket 352 to the frame 202 of the pan 200. The plurality of frame couplers 354 may be downward-pointing stub armatures coupled to the bottom of the starboard end and the port end of the hull support bracket 352. An individual frame coupler selected from the plurality of frame couplers 354 may be inserted into a top aperture of a bracket receptacle. As non-limiting examples, the bracket receptacles may comprise a plurality of starboard upright armatures 228 that are hollow, a plurality of port upright armatures that are hollow, separate receptacles coupled to the frame 202, or any combination thereof. The plurality of roller support brackets may comprise a starboard roller support bracket 356 and a port roller support bracket 358. The starboard roller support bracket 356 may be coupled to the hull support bracket 352 at an oblique angle on the starboard side of the hull support bracket 352. The port roller support bracket 358 may be coupled to the hull support bracket 352 at an opposite oblique angle on the port side of the hull support bracket 352. The plurality of roller support brackets may be operable to support the hull of the vessel with rollers. An individual roller support bracket selected from the plurality of roller support brackets may comprise a hull roller 362 and a height adjustable armature 360. The hull roller 362 may reduce friction between the vessel and the individual vessel carrier adapter 350. The height adjustable armature 360 may be operable to adjust the distance between the hull support bracket 352 and the hull roller 362 such that the individual vessel carrier adapter 350 may be customized to fit the dimensions of the vessel. The hourglass roller 364 may be coupled above the center of the hull support bracket 352 in a horizontal orientation such that the hourglass roller 364 may support the keel of the vessel. In some embodiments, the bottoms of the hull support bracket 352, the starboard roller support bracket 356, the port roller support bracket 358, or any combination thereof may comprise a stub armature that detachably couples to one of the plurality of frame cross supports 240 for stabilization of the individual vessel carrier adapter 350.

The deployable crane 370 may be a portable crane that may detachably couple to the frame 202 of the pan 200 when needed to lift the other cargo into the pan 200. The deployable crane 370 may comprise a mast 372, a boom 374, a crane winch 376, a crane cable 378, and a crane hook 380. The mast 372 may be a vertically-oriented armature that elevates the boom 374. The bottom of the mast 372 may detachably couple to a crane receptacle 382 that couples to the frame 202 of the pan 200 via a crane mounting bracket 384 and a crane locking pin 386. The mast 372 may rotate within the crane receptacle 382 such that the crane hook 380 may be positioned over the pan 200 or outside of the pan 200. The boom 374 may be a substantially horizontal armature that provides separation between the crane hook 380 and the mast 372. The length of the boom 374 may be adjustable. The crane hook 380 may be coupled to the distal end of the crane cable 378. The crane hook 380 may be detachably coupled to the other cargo. The crane winch 376 may control the movement of the crane cable 378 to raise and lower the other cargo. As non-limiting examples, the crane winch 376 may be driven by a crane motor 390 or by a crane hand-crank 392. The crane winch 376 may turn in one rotational direction to pull the crane cable 378 and thus raise the other cargo. The crane winch 376 may turn in the opposite rotational direction to let the crane cable 378 out and thus lower the other cargo.

The pan 200 may pass through a sequence of pan positions in order to load and unload. In the loading position 400, the pan 200 may be proximal to the ground with the aft starboard wheel 246 and the aft port wheel 248 on the ground, the tops of the aft starboard stanchion 280 and the aft port stanchion 290 coupled to the front of the pan 200, and the distal end of the second cable 336 coupled to the center of the pan 200. In a first intermediate position 402, the pan 200 may be pulled by the second cable 336 to an obliquely tilted orientation with the aft starboard wheel 246 and the aft port wheel 248 on the ground and the tops of the aft starboard stanchion 280 and the aft port stanchion 290 oriented vertically. In a second intermediate position 404, the pan 200 may be pulled onto the pan track 250 by decoupling the starboard hook 226 and the port hook on the pan 200 from the aft starboard locking latch 258 and the aft port locking latch and by pulling the pan 200 onto the pan track 250 using the second cable 336 such that the pan 200 is off the ground. In the transport position 406, the pair of hydraulic cylinders 300 may push the rear of the pan track 250 up to level the pan 200 and the starboard hook 226 and the port hook on the pan 200 may be coupled to the forward starboard locking latch 254 and the forward port locking latch.

In use, the pan 200 may be moved to the loading position 400 and an object 920 may be placed into the pan 200. If the object 920 is a vehicle 922, the vehicle 922 may be driven onto the pan 200 or pulled onto the pan 200 using the bow winch 206. If the object 920 is a vessel, the plurality of vessel carrier adapters may be placed onto the pan 200 and the vessel may be pulled onto the pan 200 using the bow winch 206. The pan 200 may then be moved to the first intermediate position 402, the second intermediate position 404, and finally the transport position 406 following steps described above in the specification. If the object 920 is other cargo, the other cargo may alternatively be lifted into the pan 200 using the deployable crane 370 after the pan 200 is in the transport position 406.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, an "adapter" may refer to a device that is designed to convert a first interface to a second interface. The conversion may require changes in mechanical shape or size, electrical signaling, power levels, pressures, or other physical attributes.

As used in this disclosure, an "aperture" may be an opening in a surface or object. Aperture may be synonymous with hole, slit, crack, gap, slot, or opening.

As used in this disclosure, "cargo" may refer to one or more objects that are intended to be transported using a vehicle.

As used herein, the words "couple", "couples", "coupled" or "coupling", may refer to connecting, either directly or indirectly, and does not necessarily imply a mechanical connection.

As used in this disclosure, a "crank" may be a handle or an arm that is attached perpendicularly to the axis of rotation of a shaft and that is used for transmitting rotary motion to the shaft.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "front" may indicate the side of an object that is closest to a forward direction of travel under normal use of the object or the side or part of an object that normally presents itself to view or that is normally used first. "Rear" or "back" may refer to the side that is opposite the front.

Unless noted otherwise, "ground" may refer to any surface which may support items and individuals. As non-limiting examples, ground may refer to an earthen surface whether covered by vegetation or not, a floor, a tarmac, a driveway, a road, a deck, a beach, bedrock, or a stage. The phrase "from the ground" may refer to performing an activity while standing on such a surface as opposed to climbing a ladder.

As used in this disclosure, a "hook" may be an object that is curved or bent at an angle such that items can be hung on or caught by the object or such that the object may be suspended from another object.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction or to a direction that is perpendicular to the lateral direction.

As used in this disclosure, a "motor" may refer to a device that transforms energy from an external power source into mechanical energy.

As used herein, "oblique angle" may refer to any angle that is not a right angle or a multiple of a right angle.

As used in this disclosure, "orientation" may refer to the positioning and/or angular alignment of a first object relative to a second object or relative to a reference position or reference direction.

As used herein, the word "pivot" may include any mechanical arrangement that allows for rotational motion. Non-limiting examples of pivots may include hinges, holes, posts, dowels, pins, points, rods, rivets, shafts, balls, and sockets, either individually or in combination.

As used herein, the word "portable" may refer to a device that may be carried by a single person and may be used at multiple locations. In some cases, portable may imply that the device may be used while being carried.

As used herein, "reel" may refer to a cylindrical object with side walls around which a wire, filament, thread, cord, cable, string, line, rope, hose, tubing, or other rope-like object is wound.

As used in this disclosure, a "stanchion" may refer to a vertical pole, post, or support.

As used herein, "starboard" may refer to the right side of a vessel or vehicle when facing forward and "port" may refer to the left side of the vessel or vehicle.

As used herein, the word "substantially" may be construed to mean that two or more attributes are sufficiently the same such that the performance of the invention, from the perspective of one with ordinary skill in the art, is the same as through the two or more attributes are precisely the same.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An object-loading rack for pickup trucks comprising:

a pan, a pan track, a plurality of pan track mounts, a pair of hydraulic cylinders, a plurality of vessel carrier adapters, and a deployable crane;

wherein the pan is moveable to a loading position on the ground behind a pickup truck to place an object onto the pan or to remove the object from the pan;

wherein the pan is moveable to a transport position resting in the pan track above the pickup truck for transportation;

wherein the plurality of pan track mounts support the pan track and assist in lifting the pan;

wherein the plurality of vessel carrier adapters are detachably coupled to the pan to support a vessel;

wherein the deployable crane is detachably coupled to the pan to raise and lower the object;

wherein the pan is further defined with a frame;

wherein the frame comprises a front frame, a starboard frame side, a port frame side, and a plurality of frame cross supports;

wherein the front frame extends laterally across the front of the frame and defines a front barrier for the pan;

wherein the front frame couples the front of the starboard frame side to the front of the port frame side;

wherein a bow winch is coupled to the front frame;

wherein the bow winch is operable to pull the object onto the pan using a first cable;

wherein a first guide wheel, coupled to the front frame, redirects the first cable from the bow winch to the object.

2. The object-loading rack for pickup trucks according to claim 1 wherein the object is a vehicle, the vessel, or other cargo.

3. The object-loading rack for pickup trucks according to claim 2 wherein the pan comprises the frame, flooring, an aft starboard wheel, and an aft port wheel;

wherein the pan is a moveable platform that holds the object;

wherein the pan is moveable in stages between the loading position and the transport position;

wherein the pan is pullable onto the pan track to the transport position.

4. The object-loading rack for pickup trucks according to claim 3 wherein the starboard frame side is the longitudinally-oriented starboard side of the pan;

wherein a starboard top rail and a starboard bottom rail are oriented horizontally with the starboard top rail positioned above and parallel to the starboard bottom rail;

wherein the starboard top rail comprises the top of the starboard frame side and the starboard bottom rail comprises the bottom of the starboard frame side;

wherein a plurality of starboard upright armatures are vertically oriented and are arranged along the starboard frame side with the tops of the plurality of starboard upright armatures coupled to the starboard top rail and the bottoms of the plurality of starboard upright armatures coupled to the starboard bottom rail;

wherein the front of the starboard bottom rail comprises a starboard hook positioned on the starboard bottom rail;

wherein the starboard hook is operable to secure the bottom front of the pan to the pan track.

5. The object-loading rack for pickup trucks according to claim 4 wherein the port frame side is the longitudinally-oriented port side of the pan;

wherein a port top rail and a port bottom rail are oriented horizontally with the port top rail positioned above and parallel to the port bottom rail;

wherein the port top rail comprises the top of the port frame side and the port bottom rail comprises the bottom of the port frame side;

wherein a plurality of port upright armatures are vertically oriented and are arranged along the port frame side with the tops of the plurality of port upright armatures coupled to the port top rail and the bottoms of the plurality of port upright armatures coupled to the port bottom rail;

wherein the front of the port bottom rail comprises a port hook positioned on the port bottom rail;

wherein the port hook is operable to secure the bottom front of the pan to the pan track.

6. The object-loading rack for pickup trucks according to claim 5 wherein the plurality of frame cross supports are laterally-oriented parallel armatures that couple the starboard bottom rail to the port bottom rail;

wherein the flooring comprises one or more horizontally-oriented panels that are coupled to the plurality of frame cross supports to provide a platform for the object that is being transported in the pan.

7. The object-loading rack for pickup trucks according to claim 6 wherein the aft starboard wheel is rotationally coupled to the rear of the starboard bottom rail and the aft port wheel is rotationally coupled to the rear of the port bottom rail;

wherein the aft starboard wheel and the aft port wheel are operable to reduce friction between the rear of the pan and the ground as the pan is pulled across the ground while raising and lowering the pan.

8. The object-loading rack for pickup trucks according to claim 7 wherein the pan track is suspended above the pickup truck by the plurality of pan track mounts;

wherein the pan track supports the pan during transportation of the pan;

wherein the pan track tilts during loading and unloading operations;

wherein the pan track comprises a starboard track and a port track.

9. The object-loading rack for pickup trucks according to claim 8 wherein the starboard track is longitudinally-oriented and located on the starboard side of the pan track;

wherein the starboard track is configured to guide the starboard bottom rail of the pan as the starboard bottom rail moves longitudinally along the starboard track;

wherein the starboard track comprises a forward starboard locking latch that is operable to engage with the starboard hook on the pan to secure the starboard bottom rail to the front of the starboard track;

wherein a forward starboard locking pin prevents the forward starboard locking latch and the starboard hook from disengaging until the forward starboard locking pin is actuated.

10. The object-loading rack for pickup trucks according to claim 9 wherein the port track is longitudinally-oriented and located on the port side of the pan track;

wherein the port track is configured to guide the port bottom rail of the pan as the port bottom rail moves longitudinally along the port track;

wherein the port track comprises a forward port locking latch that is operable to engage with the port hook on the pan to secure the port bottom rail to the front of the port track;

wherein a forward port locking pin prevents the forward port locking latch and the port hook from disengaging until the forward port locking pin is actuated;

wherein the starboard track and the port track are coupled by a plurality of lateral track supports for stabilization.

11. The object-loading rack for pickup trucks according to claim 10 wherein the plurality of pan track mounts comprise forward pan track mounts, aft pan track mounts, and mid pan track mounts;

wherein the plurality of pan track mounts elevate the pan track above the pickup truck;

wherein the forward pan track mounts comprise a forward starboard stanchion and a forward port stanchion;

wherein the forward starboard stanchion is a vertically-oriented armature that supports the pan track;

wherein the forward starboard stanchion is located on the starboard side of the pan track at the front of the pickup truck;

wherein the top of the forward starboard stanchion couples to the pan track;

wherein the bottom of the forward starboard stanchion couples to a front bumper;

wherein the forward port stanchion is a vertically-oriented armature that supports the pan track;

wherein the forward port stanchion is located on the port side of the pan track at the front of the pickup truck;

wherein the top of the forward port stanchion couples to the pan track;

wherein the bottom of the forward port stanchion couples to the front bumper;

wherein the tops of the forward starboard stanchion and the forward port stanchion detach from the pan track while loading and unloading the pan track.

12. The object-loading rack for pickup trucks according to claim 11 wherein the aft pan track mounts comprise an aft starboard stanchion and an aft port stanchion;

wherein the aft starboard stanchion is a vertically-oriented armature that supports the pan track;

wherein the aft starboard stanchion is located on the starboard side of the pan track at the rear of the pickup truck;

wherein the top of the aft starboard stanchion comprises an aft starboard locking latch that engages the starboard hook when the pan is pulled to the rear;

wherein an aft starboard locking pin prevents the aft starboard locking latch and the starboard hook from disengaging until the aft starboard locking pin is actuated;

wherein the bottom of the aft starboard stanchion pivotably couples to a rear bumper via an aft starboard bottom pivot;

wherein the aft port stanchion is a vertically-oriented armature that supports the pan track;

wherein the aft port stanchion is located on the port side of the pan track at the rear of the pickup truck;

wherein the top of the aft port stanchion comprises an aft port locking latch that engages the port hook when the pan is pulled to the rear;

wherein an aft port locking pin prevents the aft port locking latch and the port hook from disengaging until the aft port locking pin is actuated;

wherein the bottom of the aft port stanchion pivotably couples to the rear bumper via an aft port bottom pivot;

wherein the aft pan track mounts pivot to load and unload the pan;

wherein the aft pan track mounts are vertically upright when the pan is in the transport position;

wherein the aft pan track mounts pivot rearward placing the tops of the aft pan track mounts proximal to the ground when the pan is in the loading position;

wherein an aft stanchion support armature couples the tops of the aft pan track mounts to stabilize the aft pan track mounts during pivoting.

13. The object-loading rack for pickup trucks according to claim 12 wherein the mid pan track mounts comprise a mid starboard stanchion and a mid port stanchion;

wherein the mid pan track mounts define a tipping point for the pan during loading and unloading;

wherein the mid starboard stanchion is a vertically-oriented armature that supports the pan track;

wherein the mid starboard stanchion is located on the starboard side of the pan track centered front-to-rear on the pickup truck;

wherein the top of the mid starboard stanchion pivotably couples to the pan track via a mid starboard pivot;

wherein the bottom of the mid starboard stanchion couples to the bed;

wherein the mid port stanchion is a vertically-oriented armature that supports the pan track;

wherein the mid port stanchion is located on the port side of the pan track centered front-to-rear on the pickup truck;

wherein the top of the mid port stanchion pivotably couples to the pan track via a mid port pivot;

wherein the bottom of the mid port stanchion couples to the bed.

14. The object-loading rack for pickup trucks according to claim 13 wherein a mid center support armature is a vertical armature that supports a motor and a second guide wheel;

wherein the top of the mid center support armature is coupled to the pan track;

wherein the bottom of the mid center support armature is coupled to the bed of the pickup truck;

wherein the motor, a cable reel, and a second cable comprise a winch to raise the pan onto the pan track;

wherein one end of the second cable is coupled to the cable reel and the opposite end of the second cable is coupled to the bottom center of the pan;

wherein the second cable is wound around the cable reel by the motor to raise the pan and is unwound from the cable reel to lower the pan;

wherein the second guide wheel redirects the second cable from vertical motion to more horizontal motion to reach the pan;

wherein a third guide wheel, which is coupled to a laterally-oriented armature at the rear of the pan track, further redirects the second cable once the pan begins to descend towards the ground.

15. The object-loading rack for pickup trucks according to claim 14 wherein the pair of hydraulic cylinders comprises a starboard hydraulic cylinder and a port hydraulic cylinder;

wherein the starboard hydraulic cylinder is a vertically-oriented hydraulic cylinder located on the starboard side of the pickup truck;

wherein the bottom of the starboard hydraulic cylinder is coupled to the rear bumper of the pickup truck;

wherein the top of the starboard hydraulic cylinder is pivotably coupled to the pan track;

wherein the port hydraulic cylinder is a vertically-oriented hydraulic cylinder located on the port side of the pickup truck;

wherein the bottom of the port hydraulic cylinder is coupled to the rear bumper of the pickup truck;

wherein the top of the port hydraulic cylinder is pivotably coupled to the pan track;

wherein the pair of hydraulic cylinders are operable operated at the same time to move the rear of the pan track up and down, thus changing the tilt of the pan track;

wherein the rear of the pan track is able to be pulled down by the pair of hydraulic cylinders to tilt the pan track for loading and unloading;

wherein the rear of the pan track is able to be pushed up by the pair of hydraulic cylinders to level the pan track for transportation.

16. The object-loading rack for pickup trucks according to claim 15 wherein the plurality of vessel carrier adapters are detachably coupled to the pan to adapt the pan for transporting the vessel;

wherein the plurality of vessel carrier adapters are laterally-oriented during use;

wherein the vessel is able to be placed on top of the plurality of vessel carrier adapters such that the vessel is cradled within the plurality of vessel carrier adapters;

wherein an individual vessel carrier adapter selected from the plurality of vessel carrier adapters comprises a hull support bracket, a plurality of roller support brackets, and an hourglass roller.

17. The object-loading rack for pickup trucks according to claim 16 wherein the hull support bracket is a V-shaped armature;

wherein the hull support bracket comprises a plurality of frame couplers to detachably couple the hull support bracket to the frame of the pan;

wherein the plurality of frame couplers are downward-pointing stub armatures coupled to the bottom of the starboard end and the port end of the hull support bracket;

wherein an individual frame coupler selected from the plurality of frame couplers is able to be inserted into a top aperture of a bracket receptacle;

wherein the plurality of roller support brackets comprise a starboard roller support bracket and a port roller support bracket;

wherein the starboard roller support bracket is coupled to the hull support bracket at an oblique angle on the starboard side of the hull support bracket;

wherein the port roller support bracket is coupled to the hull support bracket at an opposite oblique angle on the port side of the hull support bracket;

wherein the plurality of roller support brackets are operable to support the hull of the vessel with rollers;

wherein an individual roller support bracket selected from the plurality of roller support brackets comprises a hull roller and a height adjustable armature;

wherein the hull roller reduces friction between the vessel and the individual vessel carrier adapter;

wherein the height adjustable armature is operable to adjust the distance between the hull support bracket and the hull roller such that the individual vessel carrier adapter is customized to fit the dimensions of the vessel;

wherein the hourglass roller is coupled above the center of the hull support bracket in a horizontal orientation such that the hourglass roller supports the keel of the vessel.

18. The object-loading rack for pickup trucks according to claim 17 wherein the deployable crane is a portable crane that detachably couples to the frame of the pan to lift the other cargo into the pan;

wherein the deployable crane comprises a mast, a boom, a crane winch, a crane cable, and a crane hook;

wherein the mast is a vertically-oriented armature that elevates the boom;

wherein the bottom of the mast detachably couples to a crane receptacle that couples to the frame of the pan via a crane mounting bracket and a crane locking pin;

wherein the mast rotates within the crane receptacle such that the crane hook is positioned over the pan or outside of the pan;

wherein the boom is a substantially horizontal armature that provides separation between the crane hook and the mast;

wherein the length of the boom is adjustable;

wherein the crane hook is coupled to the distal end of the crane cable;

wherein the crane hook is detachably coupled to the other cargo;

wherein the crane winch controls the movement of the crane cable to raise and lower the other cargo.

19. The object-loading rack for pickup trucks according to claim 18 wherein the pan passes through a sequence of pan positions in order to load and unload;

wherein in the loading position, the pan is proximal to the ground with the aft starboard wheel and the aft port wheel on the ground, the tops of the aft starboard stanchion and the aft port stanchion coupled to the front of the pan, and the distal end of the second cable coupled to the center of the pan;

wherein in a first intermediate position, the pan is able to be pulled by the second cable to an obliquely tilted orientation with the aft starboard wheel and the aft port wheel on the ground and the tops of the aft starboard stanchion and the aft port stanchion oriented vertically;

wherein in a second intermediate position, the pan is able to be pulled onto the pan track by decoupling the starboard hook and the port hook on the pan from the aft starboard locking latch and the aft port locking latch and by pulling the pan onto the pan track using the second cable such that the pan is off the ground;

wherein in the transport position, the pair of hydraulic cylinders are able to push the rear of the pan track up to level the pan and the starboard hook and the port hook on the pan are coupled to the forward starboard locking latch and the forward port locking latch.

* * * * *